US011632060B2

(12) United States Patent
Hario et al.

(10) Patent No.: US 11,632,060 B2
(45) Date of Patent: Apr. 18, 2023

(54) POWER CONVERSION DEVICE

(71) Applicant: Mitsubishi Electric Corporation, Tokyo (JP)

(72) Inventors: Masahiro Hario, Tokyo (JP); Noriyuki Imada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 107 days.

(21) Appl. No.: 17/425,779

(22) PCT Filed: Apr. 2, 2019

(86) PCT No.: PCT/JP2019/014642
§ 371 (c)(1),
(2) Date: Jul. 26, 2021

(87) PCT Pub. No.: WO2020/202468
PCT Pub. Date: Oct. 8, 2020

(65) Prior Publication Data
US 2022/0321026 A1 Oct. 6, 2022

(51) Int. Cl.
*H02M 7/483* (2007.01)
*H02M 1/32* (2007.01)
*H02M 1/00* (2006.01)

(52) U.S. Cl.
CPC ....... *H02M 7/4835* (2021.05); *H02M 1/0012* (2021.05); *H02M 1/325* (2021.05)

(58) Field of Classification Search
CPC .... H02M 7/483; H02M 7/4835; H02M 1/325; H02M 1/32; H02M 1/0012; H02M 7/537; H02M 7/53873
See application file for complete search history.

(56) References Cited

U.S. PATENT DOCUMENTS 10,819,217 B2 * 10/2020 Ido .......................... H02M 1/36
2021/0058007 A1 * 2/2021 Hario ................ H02M 7/53873
(Continued)

FOREIGN PATENT DOCUMENTS

| CN | 106602531 A | 4/2017 |
| EP | 2887526 A1 | 6/2015 |
| JP | 2017143619 A | 8/2017 |

OTHER PUBLICATIONS

International Search Report (PCT/ISA/210) and Written Opinion (PCT/ISA/237) dated Jun. 25, 2019, by the Japan Patent Office as the International Searching Authority for International Application No. PCT/JP2019/014642.

(Continued)

*Primary Examiner* — Adolf D Berhane
(74) *Attorney, Agent, or Firm* — Buchanan Ingersoll & Rooney PC

(57) ABSTRACT

A power conversion device that performs power conversion between a DC circuit and an AC circuit includes a power conversion circuit including a plurality of sub-modules, a failure detection device that detects an internal failure of the power conversion circuit, and a control device that generates an operation command controlling operation of each of the plurality of sub-modules. The control device acquires a voltage value of a capacitor included in each sub-module, calculates a deviation between a variance value indicating a variation in the voltage value of the capacitor included in the sub-module in a reference period and a reference variance value in the sub-module for each of a plurality of sub-modules, determines a failure section of an internal failure based on the deviation in each sub-module when the internal failure is detected, and outputs an operation command based on a determination result to each sub-module.

20 Claims, 9 Drawing Sheets

(56) References Cited

U.S. PATENT DOCUMENTS

2021/0391808 A1* 12/2021 Imada .................... H03K 19/20
2022/0231614 A1* 7/2022 Ido ........................ H04L 12/437

OTHER PUBLICATIONS

Extended European Search Report dated May 2, 2022, issued in corresponding European Patent Application No. 19923569.8, 9 pages.
Houchati et al., "Fault Detection in Modular Multilevel Converter using Principle Component Analysis", IEEE 12th International Conference on Compatibility, Power Electronics And Power Engineering (CPE-Powereng 2018), XP033353635, Apr. 10, 2018, pp. 1-6.

* cited by examiner

POWER CONVERSION DEVICE

TECHNICAL FIELD

The present disclosure relates to a power conversion device that performs power conversion between a DC circuit and an AC circuit.

BACKGROUND ART

A modular multilevel converter (MMC) is known as a self-excited power conversion device used in a DC power transmission system. A high voltage direct current (HVDC) system by a self-excited converter is put into practice using the modular multilevel converter. The modular multilevel converter has, for each AC phase, an upper arm connected to a high-potential-side DC terminal and a lower arm connected to a low-potential-side DC terminal. Each arm is constructed by cascade connection of a plurality of sub-modules. The "sub-module" is also referred to as a "converter cell" or a "unit converter". The sub-module includes various components such as an insulated gate bipolar transistor (IGBT), an electronic circuit that controls the IGBT, and a capacitor, and sometimes failures of these components occur.

For example, in a power conversion device of Japanese Patent Laying-Open No. 2017-143619 (PTL 1), each unit converter includes a voltage detector and a failure detector. When voltage of the capacitor detected by the voltage detector falls below or exceeds a threshold, the failure detector determines that the unit converter fails.

CITATION LIST

Patent Literature

PTL 1: Japanese Patent Laying-Open No. 2017-143619

SUMMARY OF INVENTION

Technical Problem

PTL 1 discloses a configuration detecting occurrence of a failure in the unit converter itself as described above. However, there is no teaching or suggestion about a configuration determining a failure section when another failure (for example, a short-circuit failure in an arm) different from the failure of the unit converter itself occurs in the power conversion circuit including a large number (for example, several hundred) of unit converters.

An object of one aspect of the present disclosure is to provide a power conversion device capable of accurately determining the section of the failure occurring in the power conversion circuit.

Solution to Problem

According to an embodiment, a power conversion device that performs power conversion between a DC circuit and an AC circuit is provided. The power conversion device includes a power conversion circuit including a plurality of sub-modules connected in series, a failure detection device that detects an internal failure of the power conversion circuit, and a control device that generates an operation command controlling operation of each of the plurality of sub-modules. Each sub-module includes a switching circuit and a capacitor connected in parallel to the switching circuit. The control device includes: an acquisition unit that acquires a voltage value of the capacitor included in each sub-module; a deviation calculator that calculates a deviation between a variance value indicating a variation in the voltage value of the capacitor included in the sub-module in a reference period and a reference variance value in the sub-module for each of the plurality of sub-modules; a failure section determination unit that determines a failure section of an internal failure based on the deviation in each sub-module when the internal failure is detected; and a command output unit that outputs an operation command based on a determination result of the failure section determination unit to each sub-module.

Advantageous Effects of Invention

According to the present disclosure, in the power conversion device, the section of the failure occurring in the power conversion circuit can be accurately determined.

DESCRIPTION OF EMBODIMENTS

Figure 1:
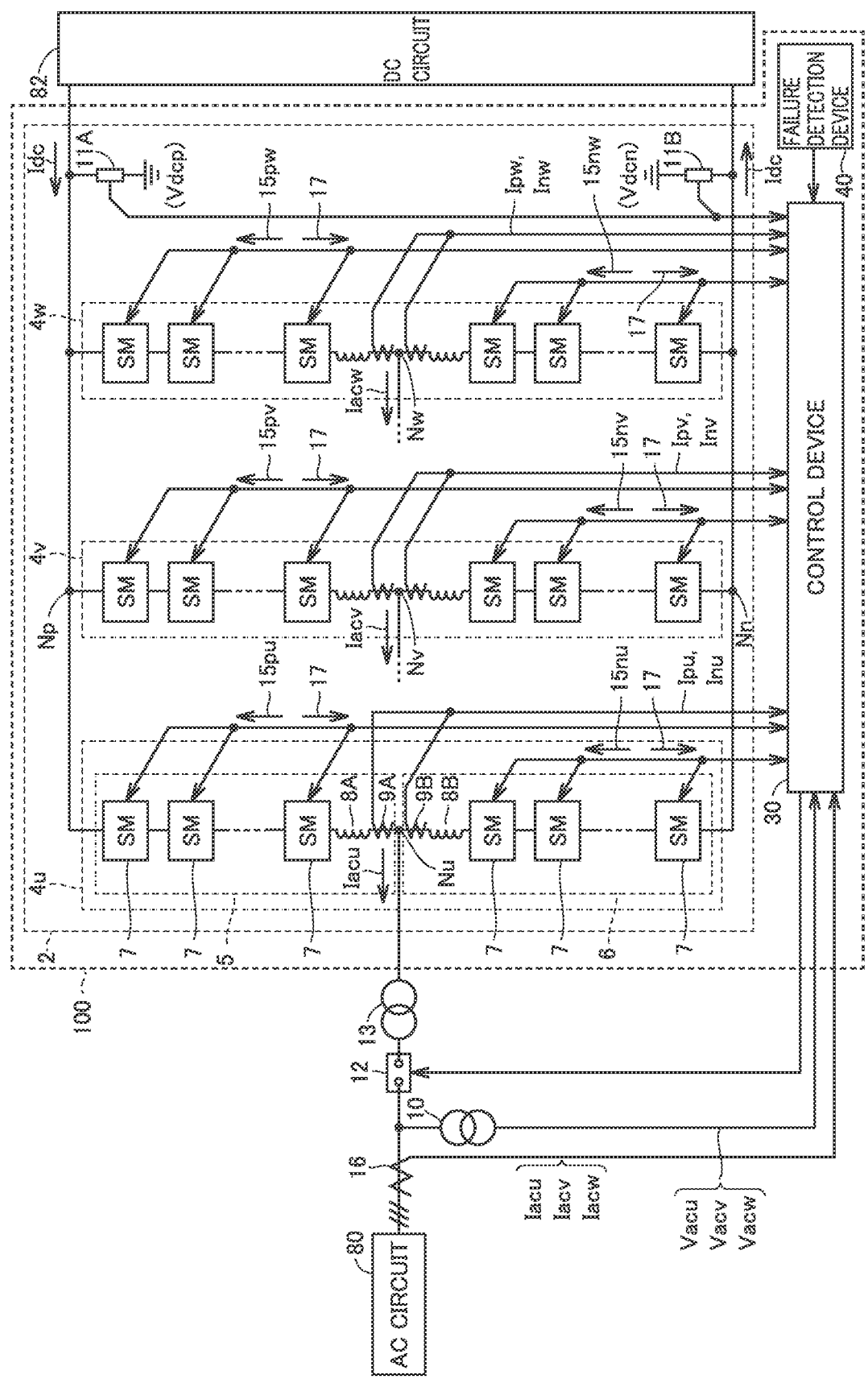
FIG. 1 is a schematic configuration diagram illustrating a power conversion device according to an embodiment.

Hereinafter, an embodiment of the present disclosure will be described with reference to the drawings. In the following description, the same parts are denoted by the same reference numeral. Their names and functions are the same. Thus, the detailed description thereof will not be repeated.

<Configuration of Power Conversion Device>

FIG. 1 is a schematic configuration diagram of a power conversion device according to an embodiment. Referring to FIG. 1, a power conversion device 100 is configured with a modular multilevel converter including a plurality of sub-modules (corresponding to "SM" in FIG. 1) 7 connected in series with each other. Power conversion device 100 performs power conversion between a DC circuit 82 and an AC circuit 80. Specifically, power conversion device 100 includes a power conversion circuit 2, a control device 30, and a failure detection device 40.

Power conversion circuit 2 includes a plurality of leg circuits 4u, 4v, 4w connected in parallel to each other between a positive DC terminal (namely, a high-potential-side DC terminal) Np and a negative DC terminal (namely, a low-potential-side DC terminal) Nn. Hereinafter, leg circuits 4u, 4v, 4w will be referred to as leg circuits 4 when are collectively referred to or arbitrarily referred to.

Leg circuit 4 is provided in each of a plurality of phases constituting an alternating current. Leg circuit 4 is connected between AC circuit 80 and DC circuit 82, and performs the power conversion between both the circuits. FIG. 1 illustrates a case where AC circuit 80 is a three-phase AC system, and three leg circuits 4u, 4v, 4w are provided corresponding to a U-phase, a V-phase, and a W-phase, respectively.

AC input terminals Nu, Nv, Nw provided in leg circuits 4u, 4v, 4w are connected to AC circuit 80 through an interconnection transformer 13. For example, AC circuit 80 is an AC power system including an AC power supply and the like. In FIG. 1, connection between AC input terminals Nv, Nw and interconnection transformer 13 is not illustrated for ease of illustration.

High-potential-side DC terminal Np and low-potential-side DC terminal Nn that are commonly connected to each leg circuit 4 are connected to DC circuit 82. For example, DC circuit 82 is a DC power system including a DC transmission network or the like, or a DC terminal for another power conversion device.

Instead of using interconnection transformer 13 of FIG. 1, power conversion device 100 may be connected to AC circuit 80 through an interconnection reactor. A primary winding may be provided in each of leg circuits 4u, 4v, 4w instead of AC input terminals Nu, Nv, Nw, and leg circuits 4u, 4v, 4w may be connected to interconnection transformer 13 or the interconnection reactor in terms of AC through a secondary winding magnetically coupled to the primary winding. In this case, the primary winding may be set to following reactors 8A, 8B. That is, leg circuit 4 is electrically (that is, in terms of DC or AC) connected to AC circuit 80 through a connection portion provided in each of leg circuits 4u, 4v, 4w, such as AC input terminals Nu, Nv, Nw or the primary winding described above.

Leg circuit 4u includes an upper arm 5 from high-potential-side DC terminal Np to AC input terminal Nu and a lower arm 6 from low-potential-side DC terminal Nn to AC input terminal Nu. AC input terminal Nu that is a connection point between upper arm 5 and lower arm 6 is connected to interconnection transformer 13. High-potential-side DC terminal Np and low-potential-side DC terminal Nn are connected to DC circuit 82. Hereinafter, leg circuit 4u will be described below as a representative because leg circuits 4v, 4w have the same configuration.

Upper arm 5 includes a plurality of sub-modules 7 connected in cascade and reactor 8A. The plurality of sub-modules 7 and reactor 8A are connected in series with each other. Lower arm 6 includes the plurality of sub-modules 7 connected in cascade and reactor 8B. The plurality of sub-modules 7 and reactor 8B are connected in series with each other.

A position where reactor 8A is inserted may be any position of upper arm 5 of leg circuit 4u, and a position where reactor 8B is inserted may be any position of lower arm 6 of leg circuit 4u. A plurality of reactors 8A and a plurality of reactors 8B may be provided. An inductance value of each reactor may be different from each other.

Further, only reactor 8A of upper arm 5 or only reactor 8B of lower arm 6 may be provided. Reactors 8A and 8B are provided so that a failure current does not rapidly increase when AC circuit 80, DC circuit 82, or the like fails.

Power conversion device 100 includes an AC voltage detector 10, an AC current detector 16, DC voltage detectors 11A, 11B, and arm current detectors 9A, 9B provided in each leg circuit 4 as detectors that measure an amount of electricity (for example, current, voltage) used for control.

The signals detected by these detectors are input to control device 30. Control device 30 outputs operation commands 15pu, 15nu, 15pv, 15nv, 15pw, 15nw controlling an operation state of each sub-module 7 based on these detection signals. Control device 30 receives a signal 17 indicating a capacitor voltage from each sub-module 7.

In the case of the embodiment, operation commands 15pu, 15nu, 15pv, 15nv, 15pw, 15nw are generated corresponding to a U-phase upper arm, a U-phase lower arm, a V-phase upper arm, a V-phase lower arm, a W-phase upper arm, and a W-phase lower arm, respectively. In the following description, operation commands 15pu, 15nu, 15pv, 15nv, 15pw, 15nw will be referred to as an operation command 15 when are collectively referred to or arbitrarily referred to.

In FIG. 1, for ease of illustration, a signal line of a signal input from each detector to control device 30 and a signal line of a signal input and output between control device 30 and each sub-module 7 are partially collectively illustrated, but are actually provided for each detector and each sub-module 7. The signal line between each sub-module 7 and control device 30 may be provided separately for transmission and for reception. In addition, in the case of the embodiment, these signals are transmitted through an optical fiber from the viewpoint of noiseproof property.

AC voltage detector 10 detects a U-phase AC voltage value Vacu, a V-phase AC voltage value Vacv, and a W-phase AC voltage value Vacw of AC circuit 80. AC current detector 16 detects a U-phase AC current value Iacu, a V-phase AC current value Iacy, and a W-phase AC current value Iacw of AC circuit 80. DC voltage detector 11A detects a DC voltage value Vdcp of high-potential-side direct-current terminal Np connected to DC circuit 82. DC voltage detector 11B detects a DC voltage value Vdcn of low-potential-side direct-current terminal Nn connected to DC circuit 82.

Arm current detectors 9A, 9B provided in U-phase leg circuit 4u detect an upper arm current Ipu flowing through upper arm 5 and a lower arm current Inu flowing through lower arm 6, respectively. Arm current detectors 9A, 9B provided in V-phase leg circuit 4v detect an upper arm current Ipv and a lower arm current Inv, respectively. Arm current detectors 9A, 9B provided in W-phase leg circuit 4w detect an upper arm current Ipw and a lower arm current Inw, respectively.

Failure detection device 40 detects an internal failure of power conversion circuit 2 and outputs a detection result to control device 30. Control device 30 outputs operation command 15 to each sub-module 7 based on the detection result of failure detection device 40.

<Configuration of Control Device>

Figure 2:
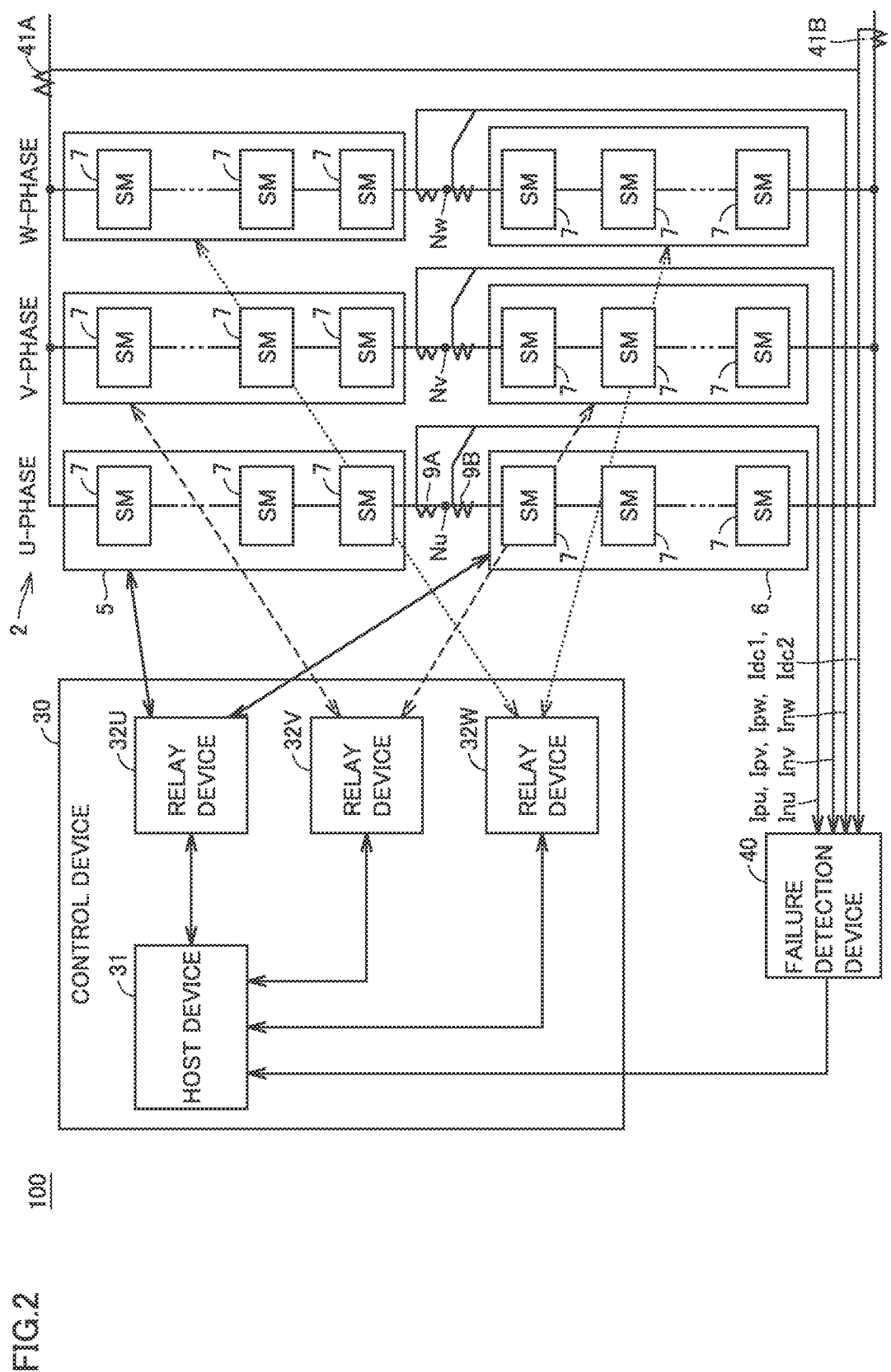
FIG. 2 is a view illustrating an example of a configuration of a control device according to the embodiment.

FIG. 2 is a view illustrating an example of a configuration of control device 30 according to the embodiment. Referring to FIG. 2, control device 30 includes a host device 31 and relay devices 32U, 32V, 32W. Hereinafter, relay devices 32U to 32W will be referred to as a relay device 32 when are collectively referred to or arbitrarily referred to.

Relay device 32 is provided between host device 31 and each sub-module 7, and relays communication between host device 31 and each sub-module 7. Each relay device 32 is configured to be able to communicate with host device 31. Each relay device 32 is connected to a predetermined number of sub-modules 7 through a star-type network. For example, relay device 32U is star-connected to each sub-module 7 corresponding to the U-phase, relay device 32V is star-connected to each sub-module 7 corresponding to the V-phase, and relay device 32W is star-connected to each sub-module 7 corresponding to the W-phase.

Host device 31 generates operation command 15 controlling the operation of each sub-module 7, and outputs generated operation command 15 to each sub-module 7 through each relay device 32. Operation command 15 includes various commands controlling each sub-module 7. For example, operation command 15 includes a drive command including a voltage command and a synchronization command and a turn-on command turning on a bypass switch provided in sub-module 7. For example, the voltage command is an output voltage command value of upper arm 5 and an output voltage command value of lower arm 6 in each of leg circuits 4u, 4v, 4w, and the synchronization command is a command synchronizing the operation of each sub-module 7.

Host device 31 receives a detection value by each detector that measures an amount of electricity (current, voltage, and the like) used for control, internal information about each sub-module 7, and a detection result by failure detection device 40. The internal information includes a voltage value (for example, corresponding to signal 17) of capacitor 24 included in sub-module 7 and state information indicating a state of sub-module 7. The state information includes information indicating whether sub-module 7 is in a normal operation state in which sub-module 7 is in a normal operation state or a stop state, failure information indicating a power abnormality, and the like. Host device 31 outputs a command normally operating each sub-module 7 in each predetermined cycle (for example, 100 μs) based on each received detection value.

When failure detection device 40 detects the internal failure of power conversion circuit 2, host device 31 calculates a variance value of the voltage of the capacitor provided in each sub-module 7, and determines a failure section of the internal failure using the variance value. For example, host device 31 outputs the stop command to stop the operation of each sub-module 7 when determining that the failure of sub-module 7 itself does not occur but a short-circuit failure occurs in power conversion circuit 2.

Host device 31 typically includes an auxiliary transformer, an analog to digital (AD) converter, an arithmetic unit, and a communication interface as a hardware configuration. The arithmetic unit includes a central processing unit (CPU) and memories such as a random access memory (RAM) and a read only memory (ROM). The AD converter includes an analog filter, a sample hold circuit, and a multiplexer. For example, control device 30 may be configured with a digital protection control device.

Typically, relay device 32 includes a control circuit that executes various types of control and a communication interface as a hardware configuration. Relay device 32 is configured with a dedicated circuit, and a part or all of the dedicated circuit may be configured with a field programmable gate array (FPGA).

Failure detection device 40 receives input of an arm current of each phase detected by arm current detectors 9A, 9B provided in each leg circuit 4, and receives input of the DC current detected by DC current detectors 41A, 41B provided in DC circuit 82. In FIG. 2, for ease of illustration, the signal line of the signal input from each of arm current detectors 9A, 9B to failure detection device 40 and the signal line of the signal input from DC current detectors 41A, 41B to failure detection device 40 are partially collectively illustrated, but are actually provided for each detector.

Typically, failure detection device 40 determines that the failure occurs in power conversion circuit 2 when a differential current between a current value for the direct current calculated from upper arm currents Ipu, Ipv, Ipu detected by each arm current detector 9A and a direct current Idc1 detected by DC current detector 41A is greater than or equal to a threshold Tha (that is, the internal failure of power conversion circuit 2 is detected). Alternatively, failure detection device 40 determines that the failure occurs in power conversion circuit 2 when a differential current between a current value for the direct current calculated from lower arm currents Inu, Inv, Inu detected by each arm current detector 9B and a direct current Idc2 detected by DC current detector 41B is greater than or equal to a threshold Thb.

<Configuration of Sub-Module>

Figure 3:
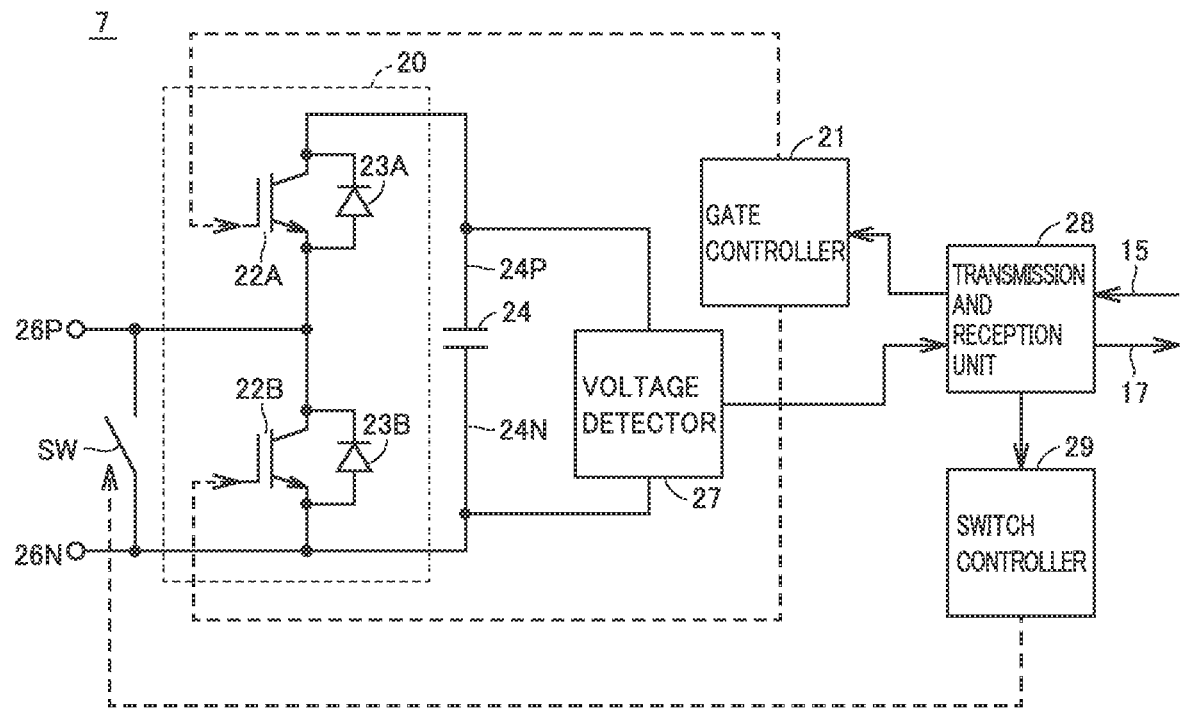
FIG. 3 is a circuit diagram illustrating an example of a sub-module constituting each leg circuit in FIG. 1.

FIG. 3 is a circuit diagram illustrating an example of sub-module 7 constituting each leg circuit 4 in FIG. 1. Sub-module 7 in FIG. 3 includes a half-bridge type switching circuit 20, a capacitor 24 as an energy accumulator, a bypass switch SW, a gate controller 21, a voltage detector 27, a transmission and reception unit 28, and a switch controller 29.

Half-bridge type switching circuit 20 includes switching elements 22A, 22B connected in series with each other and diodes 23A, 23B. Diodes 23A, 23B are connected in antiparallel (that is, parallel and reverse bias direction) with switching elements 22A, 22B, respectively. Capacitor 24 is connected in parallel with switching circuit 20. More specifically, capacitor 24 is connected in parallel with the series connection circuit of switching elements 22A, 22B, and holds the DC voltage.

A connection node of switching elements 22A, 22B is connected to an input and output terminal 26P on a high potential side. A connection node between switching element 22B and capacitor 24 is connected to an input and output terminal 26N on a low potential side. A self-arc-extinguishing switching element capable of controlling both on operation and off operation is used as each of switching elements 22A, 22B. For example, switching elements 22A, 22B are an IGBT or a gate commutated turn-off thyristor (GCT).

Bypass switch SW is connected between input and output terminals 26P, 26N. Bypass switch SW is a switch configured to be capable of short-circuiting both ends of switching element 22B by closing a contact, and is capable of passing a failure current. That is, bypass switch SW protects each element (that is, switching elements 22A, 22B, diodes 23A, 23B, and capacitor 24) included in sub-module 7 from overcurrent generated during the failure by short-circuiting sub-module 7.

Bypass switch SW is also used to short-circuit sub-module 7 when each element of sub-module 7 fails. Consequently, even when any sub-module 7 in the plurality of sub-modules 7 fails, the operation of power conversion device 100 can be continued using another sub-module 7.

Gate controller 21 operates according to the operation command received from control device 30. Specifically, gate controller 21 generates a gate control signal according to the drive command (for example, the voltage command, the synchronization command, and the like), and outputs the gate control signal to each of switching elements 22A, 22B.

Gate controller 21 performs control so that one of switching elements 22A, 22B is turned on and the other is turned off during normal operation (that is, when zero voltage or a positive voltage is output between input and output terminals 26P, 26N). When switching element 22A is in the on state while switching element 22B is in the off state, the voltage between both ends of capacitor 24 is applied between input and output terminals 26P, 26N. Conversely, when switching element 22A is in the off state while switching element 22B is in the on state, the voltage between input and output terminals 26P, 26N becomes zero volt.

Consequently, sub-module 7 outputs zero voltage or the positive voltage depending on the voltage of capacitor 24 by alternately turning on switching elements 22A, 22B.

Voltage detector 27 detects the voltage between both ends 24P, 24N of capacitor 24. In the following description, the voltage of capacitor 24 is also simply referred to as a capacitor voltage. Transmission and reception unit 28 transmits operation command 15 received from control device 30 to gate controller 21, and transmits signal 17 indicating the capacitor voltage detected by voltage detector 27 to control device 30.

When the capacitor voltage detected by voltage detector 27 is less than a threshold Thv, gate controller 21 determines that some sort of failure occurs in sub-module 7. In this case, gate controller 21 stops (that is, a gate block) the output of the gate control signal and controls switching elements 22A, 22B to be turned off.

Switch controller 29 turns on bypass switch SW according to the turn-on command included in operation command 15 received from control device 30 in FIG. 1. That is, switch controller 29 controls bypass switch SW to be turned on.

Gate controller 21, voltage detector 27, transmission and reception unit 28, and switch controller 29 may be configured with a dedicated circuit or may be configured using an FPGA or the like. In order to control these functional units, sub-module 7 includes a power supply circuit that generates power for control using the voltage of capacitor 24.

The configuration of sub-module 7 described above is an example, and sub-module 7 having another configuration may be applied to the embodiment. For example, sub-module 7 may be configured using a full-bridge type conversion circuit or a three-quarter bridge type conversion circuit.

<Operation Example During Short-Circuit Failure>

Figure 4:
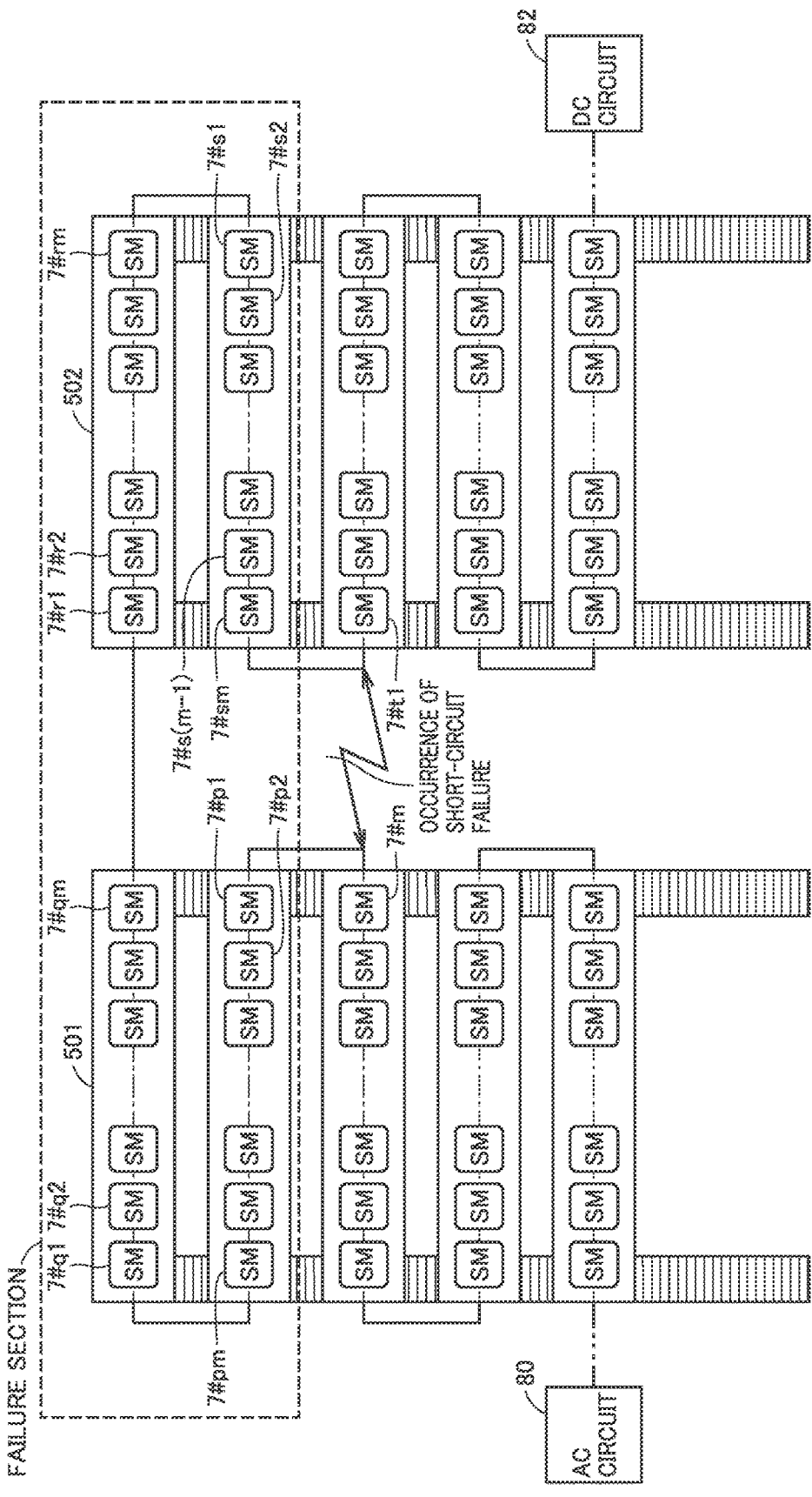
FIG. 4 is a view illustrating a short-circuit failure in a power conversion circuit.

An operation example of power conversion device 100 when the short-circuit failure occurs in power conversion circuit 2 will be described below. FIG. 4 is a view illustrating the short-circuit failure in power conversion circuit 2. In this case, it is assumed that the short-circuit failure occurs in upper arm 5 of leg circuit 4u including the plurality of sub-modules 7 corresponding to the U-phase.

Referring to FIG. 4, upper arm 5 includes a tower 501 and a tower 502 in which a large number of sub-modules 7 are arranged. For example, each of towers 501, 502 is configured with five tower steps, and m sub-modules 7 are provided per step. The number of tower steps and the number of sub-modules 7 provided per step are appropriately determined according to the number of sub-modules 7 constituting power conversion circuit 2. Tower 501 and tower 502 are disposed adjacent to each other. In the following description, for ease of explanation, each sub-module 7 is denoted by # and a reference sign for convenience, and is distinguished from each other.

At this point, it is assumed that the short-circuit failure occurs between input and output terminal 26P (that is, input and output terminal 26N on the low potential side of sub-module 7 #p1) on the high potential side of sub-module 7 #n provided in tower 501 and input and output terminal 26N (that is, input and output terminal 26P on the high potential side of sub-module 7 #sm) on the low potential side of sub-module 7 #t1 provided in tower 502.

In this case, a section between sub-module 7 #p1 and sub-module 7 #sm is a failure section. Specifically, the failure section is input and output terminal 26N on the low potential side of sub-module 7 #p1 and input and output terminal 26P on the high potential side of sub-module 7 #sm. For this reason, sub-modules 7 in the failure section are sub-modules 7 #p1 to 7 #pm, 7 #q1 to 7 #qm, 7 #r1 to 7 #rm, 7 #s1 to 7 #sm. Remaining sub-modules 7 among sub-modules 7 included in upper arm 5 are sub-modules 7 outside the failure section.

Figure 5:
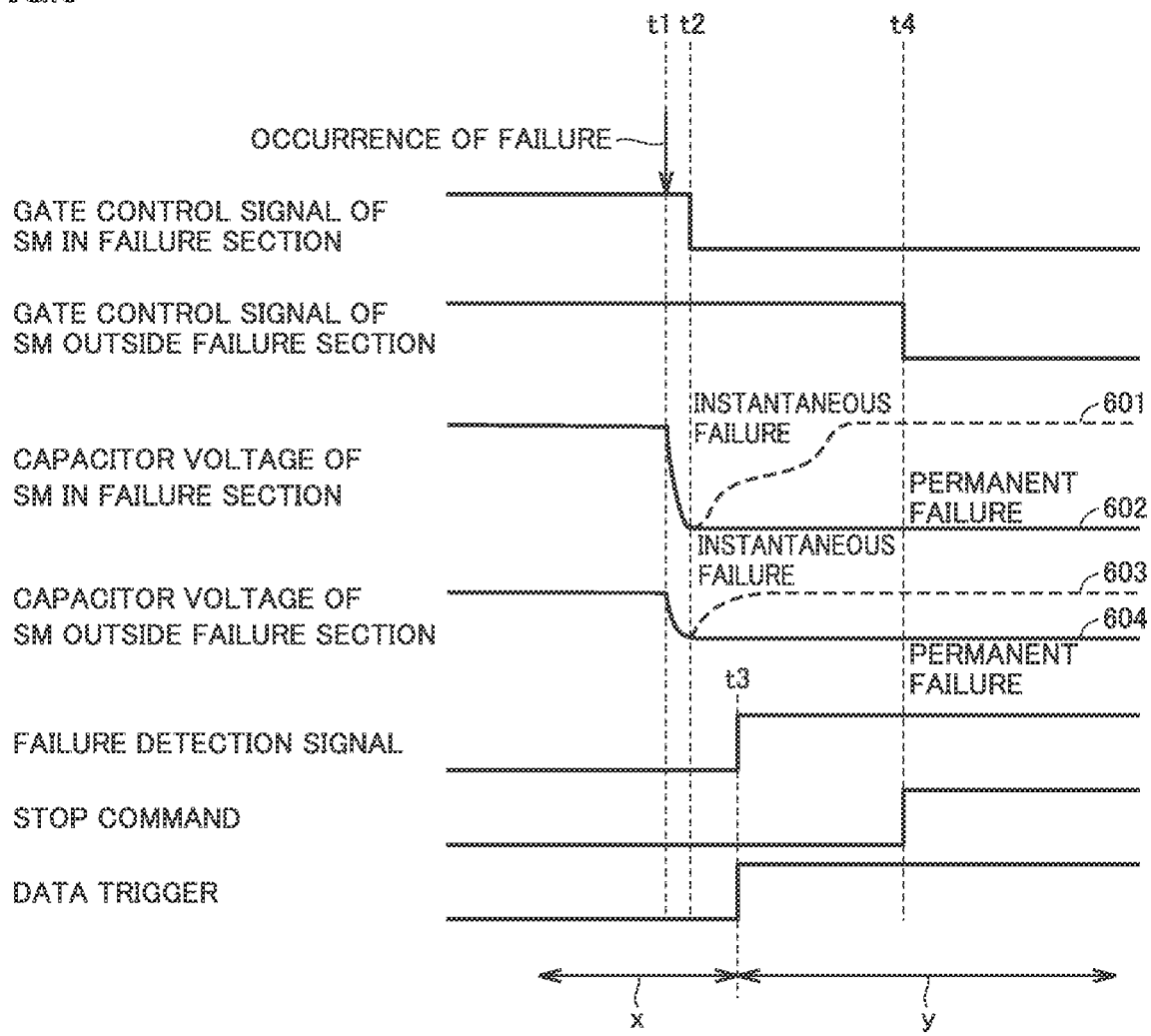
FIG. 5 is a timing chart illustrating operation of the power conversion device during the short-circuit failure.
Figure 6:
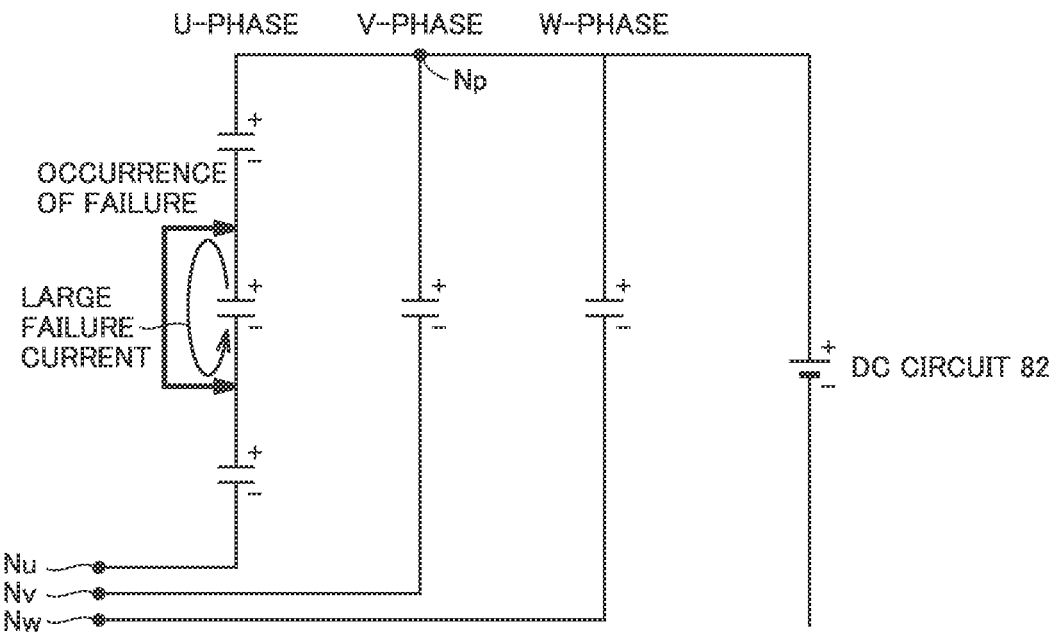
FIG. 6 is a schematic diagram illustrating an equivalent circuit of the power conversion circuit when the short-circuit failure occurs.
Figure 7:
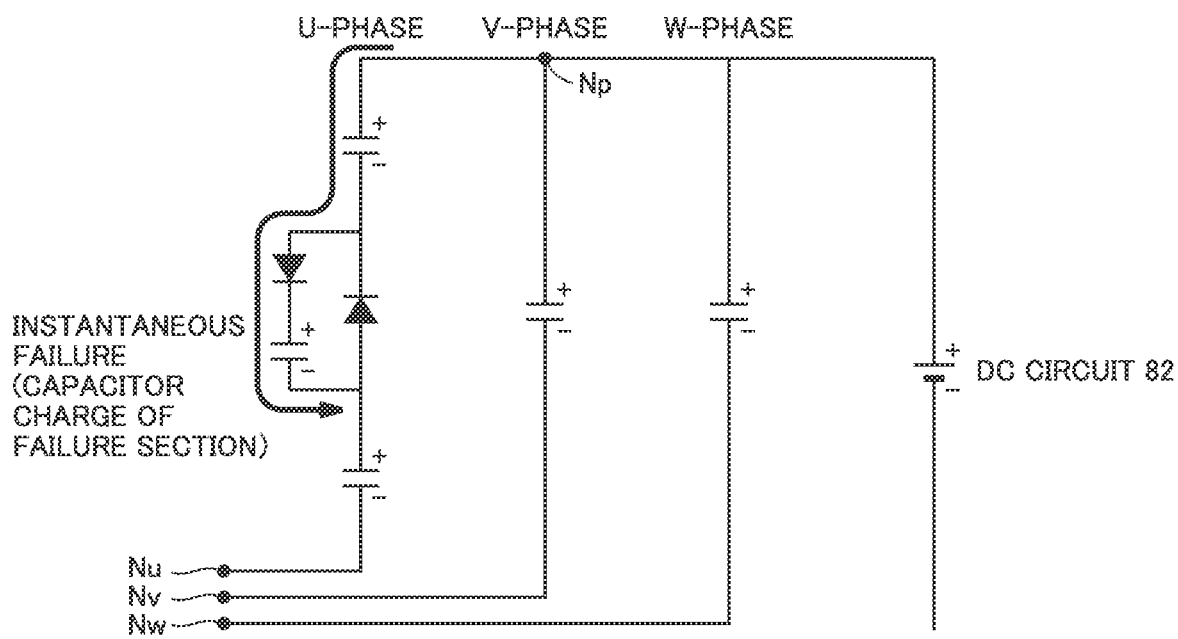
FIG. 7 is a schematic diagram illustrating the equivalent circuit of the power conversion circuit when the short-circuit failure is an instantaneous failure.
Figure 8:
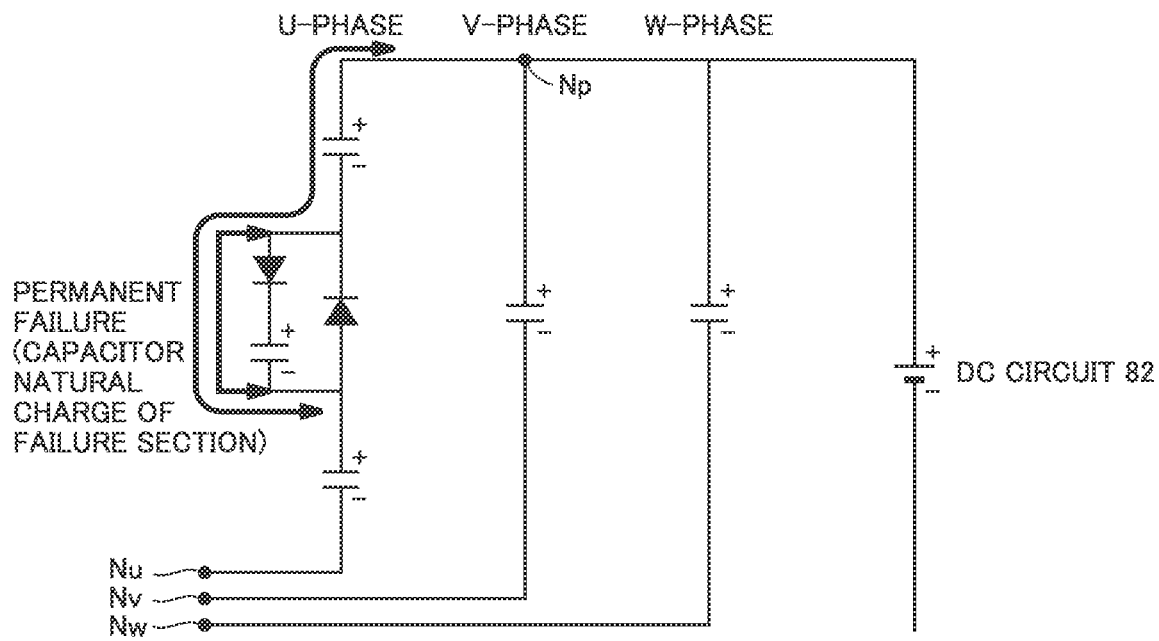
FIG. 8 is a schematic diagram illustrating the equivalent circuit of the power conversion circuit when the short-circuit failure is a permanent failure.
Figure 9:
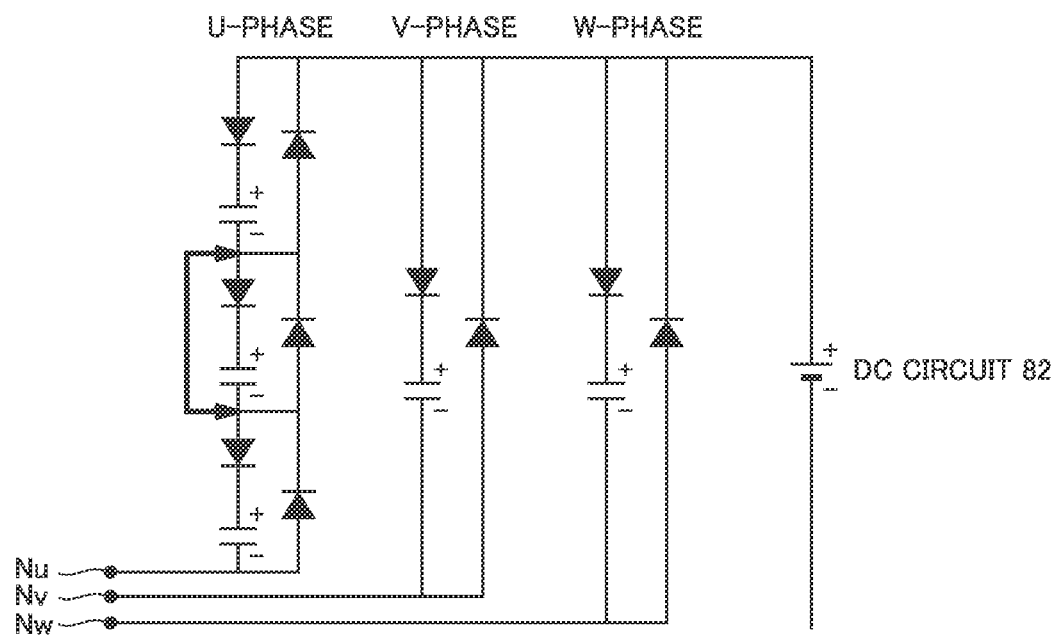
FIG. 9 is a schematic diagram illustrating the equivalent circuit of the power conversion circuit when operation of each sub-module is stopped.

FIG. 5 is a timing chart illustrating the operation of power conversion device 100 during the short-circuit failure. FIG. 6 is a schematic diagram illustrating an equivalent circuit of power conversion circuit 2 when the short-circuit failure occurs. FIG. 7 is a schematic diagram illustrating the equivalent circuit of power conversion circuit 2 when the short-circuit failure is an instantaneous failure. FIG. 8 is a schematic diagram illustrating the equivalent circuit of power conversion circuit 2 when the short-circuit failure is a permanent failure. FIG. 9 is a schematic diagram illustrating the equivalent circuit of power conversion circuit 2 when the operation of each sub-module 7 is stopped.

Referring to FIG. 5, it is assumed that the short-circuit failure in FIG. 4 occurs at time t1 in U-phase upper arm 5. In this case, as illustrated in FIG. 6, a charge is discharged from capacitor 24 (hereinafter, also simply referred to as "capacitor 24 in the failure section") included in sub-module 7 in the failure section, the capacitor voltage rapidly decreases, and a large failure current flows.

For this reason, as illustrated in FIG. 5, at time t2 after time t1, the voltage at the capacitor in the failure section greatly decreases, and the output of the gate control signal is stopped according to the decrease. Specifically, gate controller 21 of sub-module 7 in the failure section determines that the capacitor voltage is less than threshold Thy, stops the output of the gate control signal, and turns off switching elements 22A, 22B. As described above, sub-module 7 in the failure section spontaneously stops the operation with the voltage drop of capacitor 24. Gate controller 21 transmits the state information indicating that sub-module 7 is in the stop state to control device 30 through transmission and reception unit 28.

On the other hand, because a voltage drop width of capacitor 24 included in sub-module 7 outside the failure section (hereinafter, also simply referred to as "capacitor 24 outside the failure section") is small, the capacitor voltage is greater than or equal to threshold Thv. For this reason, the output of the gate control signal is maintained, and sub-module 7 outside the failure section does not enter the stop state.

When the short-circuit failure is the instantaneous failure indicating a temporary failure, as illustrated in FIG. 7, capacitor 24 in the failure section is charged by the current from the side of high-potential-side DC terminal Np. For this reason, as indicated by a curve 601 in FIG. 5, the voltage at capacitor 24 in the failure section gradually increases. Similarly, capacitor 24 outside the failure section is also charged by the current from the side of high-potential-side DC terminal Np. For this reason, as indicated by a curve 603 in FIG. 5, the voltage of capacitor 24 outside the failure section also gradually increases.

On the other hand, when the short-circuit failure is the permanent failure, as illustrated in FIG. 8, the charge of capacitor 24 in the failure section is not charged. Similarly, capacitor 24 outside the failure section is not charged. For this reason, the voltages of capacitors 24 in the failure section and the outside of the failure section maintain a lowered state as indicated by curves 602 and 604 in FIG. 5. The charge of each capacitor 24 is slowly and naturally discharged by resistance in sub-module 7. The permanent failure is not a failure that can automatically recover a steady state when the failure disappears, such as a temporary failure, but is a failure that requires repair and confirmation by a person for the recovery.

Referring to FIG. 5, at time t3 after time t2, a failure detection signal indicating that failure detection device 40 detects an internal failure of power conversion circuit 2 is output to host device 31. Host device 31 stores various data before and after the short-circuit failure with the reception of the failure detection signal as a trigger. The various data include the current value and the voltage value that are detected by each detector, the voltage value of each capacitor 24, and the like.

Specifically, host device 31 normally stores various data acquired within a certain period (for example, a period x) from a past time point to the present time, and sequentially deletes the various data acquired prior to the certain period preceding the present time. However, when the failure detection signal is received, host device 31 stores various data acquired within a following period y from a reception time point while storing various data acquired within preceding period x from the reception time point. That is, host device 31 stores various data acquired within the preceding period x from the reception time point and the following period y from the reception time point.

Then, at time t4 after time t3, host device 31 outputs the stop command stopping all sub-modules 7 included in power conversion circuit 2. In response to the reception of the stop command, gate controller 21 of sub-module 7 outside the failure section stops the output of the gate control signal, and turns off switching elements 22A, 22B. The equivalent circuit in FIG. 9 is obtained because switching elements 22A, 22B are also turned off in sub-module 7 outside the failure section. In this case, the charges of all capacitors 24 are naturally discharged by the resistance in sub-module 7.

While the case where the short-circuit failure occurs in U-phase upper arm 5 is described above, the operation is similarly performed even when the short-circuit failure occurs in each arm of U-phase lower arm 6 and other phases (for example, V-phase, W-phase).

<Failure Section Determination Method>

As described with reference to FIG. 5, when the short-circuit failure occurs in power conversion circuit 2, the change in capacitor voltage in the failure section of the short-circuit failure is large, and the change in capacitor voltage outside the failure section is small. On the other hand, even when each sub-module 7 is normally operated, the detected capacitor voltage has a constant fluctuation width because a ripple voltage is superimposed on the capacitor voltage. Accordingly, power conversion device 100 of the embodiment determines the failure section of the short-circuit failure using the variance value indicating variation of the capacitor voltage in a reference period.

Specifically, host device 31 sequentially receives the internal information (for example, capacitor voltage value) about each sub-module 7. Host device 31 calculates the variance value of the capacitor voltage in the reference period of sub-module 7 based on the capacitor voltage of sub-module 7 acquired in the reference period. For example, a variance value $J\_i$ of sub-module 7 #i having an identification ID "i" is expressed by the following equation (1).

$$J\_i = \{(Vsm\_i(1)-Vsm\_r)^2+(Vsm\_i(2)-Vsm\_r)^2+\ldots\\+(Vsm\_i(n)-Vsm\_r)^2\}/n \quad (1)$$

In the equation, n is the number of samples of the capacitor voltage in the reference period, $Vsm\_i(n)$ is the nth capacitor voltage of sub-module 7 having the identification ID "i", and $Vsm\_r$ is the reference voltage value (for example, rated voltage value) of the capacitor voltage. For example, the reference period is a period corresponding to an electrical angle of 180°, and a sampling period T is time corresponding to the electrical angle of 1.875°. In this case, the number n of samples is "96". As illustrated in equation (1), variance value $J\_i$ is a value obtained by dividing the sum of squares of the difference between the capacitor voltage sampled in the reference period and the reference voltage value of capacitor 24 by the number of samples.

Host device 31 calculates a deviation $De\_i$ between variance value $J\_i$ of sub-module 7 #i and a reference variance value $Js\_i$ of sub-module 7 #i. For example, deviation $De\_i$ is expressed by the following equation (2).

$$\text{Deviation } De\_i = |Js\_i - J\_i| \quad (2)$$

"||" represents an absolute value symbol. Typically, reference variance value $Js\_i$ is a variance value calculated when the internal failure does not occur in power conversion circuit 2 but power conversion circuit 2 is normally operated. For example, during the normal operation immediately after the operation of power conversion device 100, host device 31 calculates the variance value of sub-module 7 #i using equation (1) and stores the calculated variance value in the memory as reference variance value $Js\_i$.

At this point, as in the example of FIG. 4, it is assumed that the short-circuit failure occurs between sub-module 7 #p1 and sub-module 7 #sm in U-phase upper arm 5. At this time, host device 31 receives the failure detection signal indicating the internal failure from the failure detection device 40.

As illustrated in FIG. 5, the decrease width of the capacitor voltage is large in each sub-module 7 in the failure section, and the decrease width of the capacitor voltage is small in each sub-module 7 outside the failure section. For this reason, when the short-circuit failure occurs, the variance value of the capacitor voltage of each sub-module 7 in the failure section greatly decreases, but the variance value of the capacitor voltage of each sub-module 7 outside the failure section does not decrease so much. In other words, the deviation in each sub-module 7 (for example, sub-module 7 #p1 to 7 #sm) in the failure section is large, and the deviation in each sub-module 7 outside the failure section is small.

Thus, when deviation $De\_i$ of sub-module 7 #i is greater than or equal to a reference deviation $Des$, host device 31 determines that sub-module 7 #i is sub-module 7 in the failure section. When deviation $De\_i$ of sub-module 7 #i is less than reference deviation $Des$, host device 31 determines that sub-module 7 #i is sub-module 7 outside the failure section.

Specifically, when determining that each of the deviation in sub-module 7 #p1, the deviation in sub-module 7 #sm, and the deviations in sub-modules 7 #p2 to 7 #s (m−1) connected between sub-module 7 #p1 and sub-module 7 sm is greater than or equal to reference deviation Des, host device 31 determines that the short-circuit failure occurs between sub-module 7 #p1 and sub-module 7 #sm. In this case, the failure section is between sub-module 7 #p1 and sub-module 7 #sm.

It is assumed that the short-circuit failure does not occur as in the example of FIG. 4 but the failure occurs in one sub-module 7 itself among sub-modules 7 included in U-phase upper arm 5. In this case, the deviation in one sub-module 7 is greater than or equal to reference deviation Des, and the deviations in remaining sub-modules 7 other than the one sub-module are less than reference deviation Des. In such a case, host device 31 determines that one sub-module 7 itself fails. The failure section is between input and output terminal 26P and the input and output terminal 26N of one sub-module 7. One sub-module 7 detects the voltage drop of capacitor 24 and voluntarily stops (that is, the output of the gate control signal is stopped) its operation.

As described above, host device 31 can determine the failure section of the internal failure occurring in power conversion circuit 2 using the variance value of the capacitor voltage of each sub-module 7.

<Functional Configuration>

Figure 10:
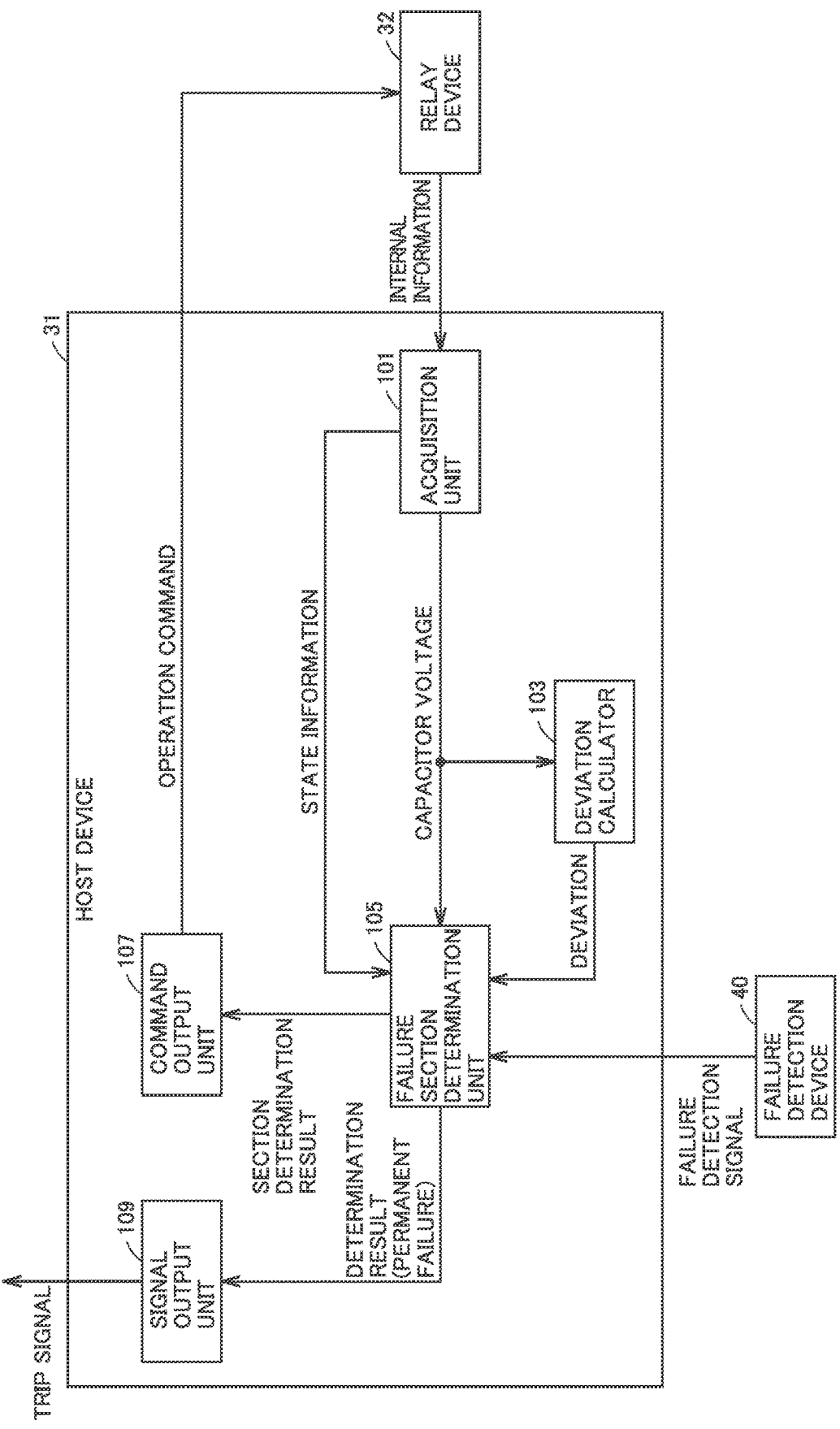
FIG. 10 is a block diagram illustrating an example of a functional configuration of a host device according to the embodiment.

FIG. 10 is a block diagram illustrating an example of a functional configuration of host device 31 according to the embodiment. Referring to FIG. 10, host device 31 includes an acquisition unit 101, a deviation calculator 103, a failure section determination unit 105, a command output unit 107, and a signal output unit 109 as main functional configurations. Typically, a CPU of host device 31 executes a program stored in the ROM, whereby these functions are implemented. Some or all of these functions may be implemented using a dedicated circuit.

Acquisition unit 101 acquires the internal information about each sub-module 7 through relay device 32. The internal information includes a capacitor voltage value (for example, corresponding to signal 17) of each sub-module 7 and the state information indicating a state of sub-module 7.

For each of the plurality of sub-modules 7, deviation calculator 103 calculates the deviation (for example, deviation De_i) between the variance value (for example, the variance value J_i) of the capacitor voltage in sub-module 7 and the reference variance value (for example, reference variance value Js_i) in the sub-module. Deviation calculator 103 calculates variance value J_i using equation (1) and calculates deviation De_i using equation (2).

Failure section determination unit 105 determines that the internal failure is detected based on the reception of the failure detection signal from failure detection device 40. When the internal failure is detected, failure section determination unit 105 determines the failure section of the internal failure based on the deviation in each sub-module 7.

Failure section determination unit 105 performs the determination according to <failure section determination method> described above. In one aspect, when all of the deviation in first sub-module 7, the deviation in second sub-module 7, and the deviation in one or more other sub-modules 7 connected between first and second sub-modules 7 are greater than or equal to reference deviation Des, failure section determination unit 105 determines that the short-circuit failure occurs between the first sub-module and the second sub-module.

In another aspect, when the deviation in one sub-module 7 among sub-modules 7 (for example, each sub-module 7 included in U-phase upper arm 5) is greater than or equal to reference deviation Des and deviation De in remaining sub-modules 7 other than the one sub-module is less than reference deviation Des, failure section determination unit 105 determines that the failure occurs in the one sub-module itself.

Command output unit 107 outputs the operation command based on the determination result of failure section determination unit 105 to each sub-module 7 through relay device 32. In one aspect, when failure section determination unit 105 determines that the short-circuit failure occurs, command output unit 107 outputs the stop command stopping the operation of each sub-module 7 to relay device 32 as the operation command. The stop command is transmitted to each sub-module 7 through relay device 32. In this case, power conversion circuit 2 is in a gate block state, namely, switching elements 22A, 22B of each sub-module 7 become the off state.

In another aspect, when failure section determination unit 105 determines that the short-circuit failure does not continue, command output unit 107 outputs a recovery command recovering the operation of the plurality of sub-modules. The recovery command is transmitted to each sub-module 7 through relay device 32. In this case, power conversion circuit 2 is in a deblock state, namely, the state in which switching elements 22A, 22B of each sub-module 7 can be turned on.

For example, failure section determination unit 105 determines whether the short-circuit failure continues using the capacitor voltage and the state information of each sub-module 7. Specifically, when the capacitor voltage of each sub-module 7 in the failure section is less than threshold Thy even when a period T1 elapses after the state information indicating that each sub-module 7 in the failure section of the short-circuit failure is in the stop state is received, failure section determination unit 105 determines that the short-circuit failure continues (that is, the short-circuit failure is a permanent failure). On the other hand, when the capacitor voltage of each sub-module 7 in the failure section is greater than or equal to threshold Thy after the lapse of period T1 from the reception of the state information, failure section determination unit 105 determines that the short-circuit failure does not continue (that is, the short-circuit failure is the instantaneous failure).

In addition, failure section determination unit 105 may determine that the short-circuit failure continues when determining that each of deviation De_1, deviation De_2, and deviation De_o is greater than or equal to reference deviation Des again after the lapse of a period T2 from the determination that the short-circuit failure occurs between the first sub-module and the second sub-module.

In still another aspect, when failure section determination unit 105 determines that the failure occurs in the one sub-module itself, command output unit 107 outputs the turn-on command turning on bypass switch SW included in the one sub-module as the operation command. The turn-on command is transmitted to one sub-module 7 through relay device 32.

When failure section determination unit 105 determines that the short-circuit failure occurs, command output unit 107 may output the turn-on command turning on bypass switch SW included in each sub-module 7 in the failure section of the short-circuit failure as the operation command. Consequently, bypass switch SW of sub-module 7 in the failure section is turned on, but bypass switch SW of sub-module 7 outside the failure section is not turned on. However, this operation is performed when the number of sub-modules 7 in the failure section is small (for example, in the case of the number of operable ranges). This is because it may take time when opening work is started by turning on bypass switch SW in temporarily stopping and restoring the operation in the case where the number of sub-modules 7 in the failure section is large (for example, in the case where the number of sub-modules 7 in the failure section is greater than the number of operable ranges).

As another example of turning on bypass switch SW, switch controller 29 of sub-module 7 may be configured to turn on bypass switch SW when the capacitor voltage becomes less than threshold Thy. According to this configuration, when the short-circuit failure occurs, the capacitor voltage temporarily becomes less than threshold Thy, so that bypass switch SW of sub-module 7 outside the failure section may be turned on.

For this reason, in order to prevent the turn-on of bypass switch SW of sub-module 7 outside the failure section, bypass switch SW is preferably turned on after the failure section is determined. However, there is also an advantage that bypass switch SW can be turned on earlier in the configuration in which bypass switch SW is turned on by the determination of sub-module 7 itself. For this reason, which configuration is adopted may be appropriately determined by a system operator.

When failure section determination unit 105 determines that the short-circuit failure continues, signal output unit 109 outputs the trip signal opening a circuit breaker 12 connected to AC circuit 80.

In the example of FIG. 10, the configuration in which the deviation calculator 103 of host device 31 calculates the variance value of sub-module 7 is described, but the variance value may be calculated by relay device 32 or sub-module 7.

As an example, sub-module 7 stores a reference voltage value Vsm_r of the capacitor voltage, calculates the variance value using equation (1), and transmits the calculated variance value to relay device 32 as the internal information about sub-module 7. Relay device 32 transmits the internal information including the variance value calculated by each sub-module 7 to host device 31. In this case, deviation calculator 103 may calculate the deviation using the variance value of each sub-module 7 acquired by acquisition unit 101.

As another example, relay device 32 stores reference voltage value Vsm_r of the capacitor voltage of each sub-module 7 in the internal memory. Relay device 32 calculates the variance value of each sub-module 7 using equation (1), and transmits the internal information including the calculated variance value of each sub-module 7 to host device 31.

<Processing Procedure>

Figure 11:
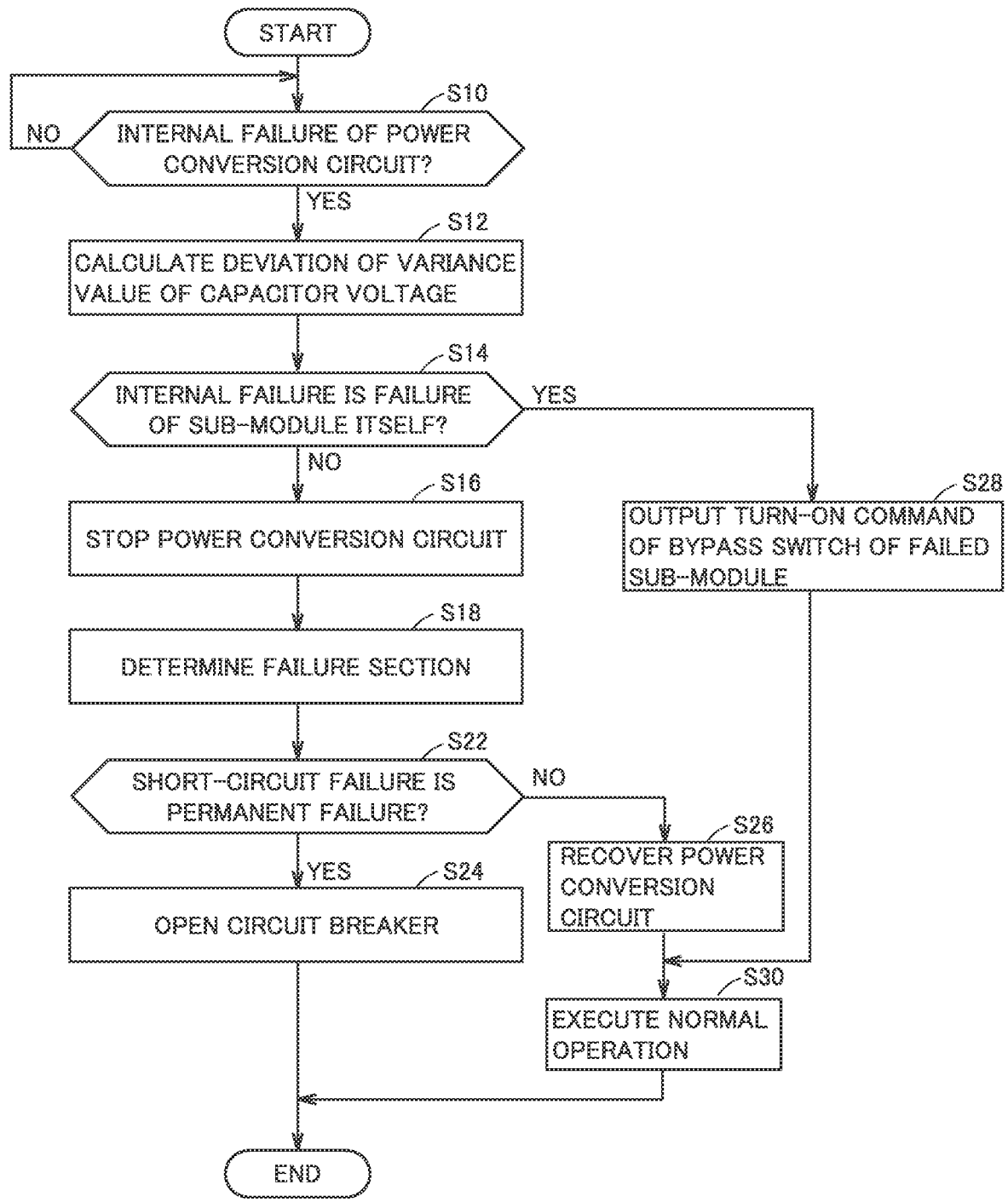
FIG. 11 is a flowchart illustrating an example of a processing procedure of the host device according to the embodiment.

FIG. 11 is a flowchart illustrating an example of a processing procedure of host device 31 according to the embodiment. Typically, each of the following steps is executed by the CPU of host device 31. Hereinafter, it is assumed that host device 31 receives the internal information from each sub-module 7 through relay device 32.

Referring to FIG. 11, host device 31 determines whether the internal failure occurs in power conversion circuit 2 (step S10). Typically, host device 31 determines that the internal failure occurs when receiving the failure detection signal from failure detection device 40, and host device 31 determines that the internal failure does not occur when not receiving the failure detection signal.

When the internal failure does not occur (NO in step S10), host device 31 repeats the processing of step S10. When the internal failure occurs (YES in step S10), host device 31 calculates the deviation of the variance value of the capacitor voltage in each sub-module 7 (step S12). The output of the gate control signal is stopped in sub-module 7 in which the decrease in the capacitor voltage is detected with the occurrence of the internal failure.

Host device 31 determines whether the internal failure is the failure of sub-module 7 itself based on the deviation in each sub-module 7 (step S14). For example, when the deviation of one sub-module 7 of U-phase sub-modules 7 is greater than or equal to reference deviation Des and the deviation of remaining sub-modules 7 of U-phase sub-modules 7 is less than reference deviation Des, host device 31 determines that the internal failure is the failure of the one sub-module 7 itself.

When the internal failure is the failure of sub-module 7 itself (YES in step S14), host device 31 outputs the turn-on command turning on bypass switch SW of failed sub-module 7 (step S28). The turn-on command is transmitted to failed sub-module 7 through relay device 32, and bypass switch SW is turned on. Subsequently, host device 31 executes processing in step S30 described later.

On the other hand, when the internal failure is not the failure of sub-module 7 itself (that is, the short-circuit failure) (NO in step S14), host device 31 outputs the stop command stopping the operation of each sub-module 7 of power conversion circuit 2 (step S16). Consequently, power conversion circuit 2 enters the gate block state.

Then, host device 31 determines the failure section based on the deviation in each sub-module 7 (step S18). For example, when the deviation of each of the plurality of sub-modules 7 #p1 to 7 #sm connected in series in each of U-phase sub-modules 7 is greater than or equal to reference deviation Des, it is determined that the section between the sub-module 7 #p1 and sub-module 7 #sm is the failure section of the short-circuit failure.

Then, host device 31 determines whether the short-circuit failure is the permanent failure (step S22). When the short-circuit failure is the permanent failure (YES in step S22), host device 31 outputs a trip signal to the circuit breaker 12 to open circuit breaker 12 (step S24). When the short-circuit failure is the instantaneous failure (NO in step S22), host device 31 outputs a recovery command recovering the operation of each sub-module 7 of power conversion circuit 2 (step S26). Consequently, power conversion circuit 2 enters the deblock state. Then, host device 31 executes normal operation of power conversion circuit 2 (step S30).

<Advantages>

According to the embodiment, it is possible to accurately determine the failure section in the internal failure of power conversion circuit 2. Specifically, it is possible to determine whether the failure occurs in sub-module 7 itself or the section in power conversion circuit 2 where the short-circuit failure occurs.

In addition, it is not necessary to provide a current sensor or the like in each sub-module 7 in power conversion circuit 2 because control device 30 of the embodiment determines the failure section using the variance value of each sub-module 7. In addition, because control device 30 can accurately determine the failure section occurring in power conversion circuit 2, it is not necessary to visually confirm each sub-module 7, and power conversion circuit 2 can be quickly restarted.

Other Embodiments (1) In the embodiment, host device 31 may determine deterioration of capacitor 24 in each sub-module 7 using the deviation of the variance value of the capacitor voltage in each sub-module 7. For example, a configuration determining the deterioration of capacitor 24 of sub-module 7 #i will be described.

Host device 31 includes a deterioration determination unit that determines whether capacitor 24 included in each sub-module 7 is deteriorated based on the deviation in each sub-module 7 when the internal failure is not detected.

Specifically, the deterioration determination unit calculates the deviation between reference variance value Js_i of sub-module 7i and variance value Ja_i of sub-module 7i when the internal failure does not occur in power conversion circuit 2 and power conversion circuit 2 is normally operated. Reference variance value Js_i is a variance value calculated during the normal operation immediately after the operation of power conversion device 100 in which capacitor 24 of sub-module 7i is not deteriorated. Variance value Ja_i is a variance value calculated during the normal operation after the lapse of a certain period (for example, several years) from the operation of power conversion device 100.

When capacitor 24 of sub-module 7i is deteriorated, variance value Ja_i increases because the variation in the capacitor voltage increases. For this reason, the deviation between reference variance value Js_i and variance value Ja_i increases. Accordingly, the deterioration determination unit determines that capacitor 24 of sub-module 7i is deteriorated when the deviation is greater than or equal to reference deviation Det even during the normal operation in which the internal failure does not occur. When the deviation is less than reference deviation Det, the deterioration determination unit determines that capacitor 24 is not deteriorated. The deterioration determination unit may finally determine that capacitor 24 is deteriorated when the number of determinations in which the deviation is greater than or equal to reference deviation Det reaches a specified number.

(2) In the above embodiment, the operation command generated by host device 31 and the data used for the failure section determination of the internal failure may be configured to be communicated through different communication paths.

Specifically, the operation command generated by host device 31 is transmitted to each sub-module 7 through relay device 32. When a large communication delay is generated in the communication path transmitting the operation command, the delay needs to be suppressed as much as possible because the control becomes unstable.

On the other hand, the data amount of the internal information including the capacitor voltage transmitted from relay device 32 to host device 31 increases because power conversion circuit 2 has the large number of sub-modules 7. For this reason, when the communication path communicating the operation command and the communication path communicating the internal information used for determining the failure section of the internal failure are the same, a difference is generated between a communication amount in an upstream direction (that is, the direction from relay device 32 to host device 31) and a communication amount in a downstream direction (that is, the direction from host device 31 to relay device 32). In this case, when a communication speed is adjusted to the direction in which the communication amount is large (that is, upward direction), there is a possibility that the communication delay of the operation command becomes large.

Accordingly, the data used for the failure section determination of the internal failure may be transmitted through a communication path different from the data used for normal control. Specifically, host device 31 transmits the operation command to relay device 32 through a first communication path. Relay device 32 transmits the internal information (for example, capacitor voltage and state information) about each sub-module 7 to host device 31 through a second communication path. Typically, the communication speed of the communication through the first communication path is higher than the communication speed of the communication through the second communication path. In this case, host device 31 and relay device 32 have a high-speed (that is, for the first communication path) communication interface and a low-speed (that is, for the second communication path) communication interface.

The data used when host device 31 generates the operation command is transmitted from relay device 32 to host device 31 through the first communication path. Typically, the data is not the individual internal information transmitted from each sub-module 7 to relay device 32, but is the data in which the internal information of each sub-module 7 is aggregated in relay device 32, and thus the data amount is decreased. For this reason, even when the data is transmitted through the first communication path, the communication delay of the operation command is not generated. For example, relay device 32 transmits the capacitor voltage obtained by averaging the capacitor voltages of sub-modules 7 for each arm circuit as the data.

(3) The configuration exemplified as the embodiment is an example of the configuration of the present disclosure, and can be combined with another known technique, or can be modified, for example, partially omitted without departing from the gist of the present disclosure. In addition, in the embodiment, the processes and configurations described in other embodiments may be appropriately adopted and implemented.

It should be considered that the disclosed embodiment is an example in all respects and not restrictive. The scope of the present disclosure is defined by not the above description, but the claims, and it is intended that all modifications within the meaning and scope of the claims are included in the present disclosure.

REFERENCE SIGNS LIST

2: power conversion circuit, 4u, 4v, 4w: leg circuit, 5: upper arm, 6: lower arm, 7: sub-module, 8A, 8B: reactor, 9, 9A, 9B: arm current detector, 10: AC voltage detector, 11A, 11B: DC voltage detector, 12: circuit breaker, 13: interconnection transformer, 15nu to 15pw: operation command, 16: AC current detector, 17: signal, 20: switching circuit, 21: gate controller, 22A, 22B: switching element, 23A, 23B: diode, 24: capacitor, 26N, 26P: input and output terminal, 27: voltage detector, 28: transmission and reception unit, 29: switch controller, 30: control device, 31: host device, 32U, 32V, 32W: relay device, 40: failure detection device, 41: DC current detector, 80: AC circuit, 82: DC circuit, 100: power conversion device, 101: acquisition unit, 103: deviation calculator, 105: failure section determination unit, 107: command output unit, 109: signal output unit, 501, 502: tower

The invention claimed is:
1. A power conversion device that performs power conversion between a DC circuit and an AC circuit, the power conversion device comprising:
a power conversion circuit including a plurality of sub-modules connected in series with each other;
a failure detection device to detect an internal failure of the power conversion circuit; and a control device to generate an operation command controlling operation of each of the plurality of sub-modules, wherein each of the sub-modules includes a switching circuit and a capacitor connected in parallel to the switching circuit, and the control device includes:
   an acquisition unit to acquire a voltage value of the capacitor included in each of the sub-modules;
   a deviation calculator to calculate a deviation between a variance value indicating a variation in a voltage value of the capacitor included in the sub-module in a reference period and a reference variance value in the sub-module for each of the plurality of sub-modules;
   a failure section determination unit to determine a failure section of the internal failure based on the deviation in each of the sub-modules when the internal failure is detected; and
   a command output unit to output the operation command based on a determination result of the failure section determination unit to each of the sub-modules.

2. The power conversion device according to claim 1, wherein when the deviation in a first sub-module, the deviation in a second sub-module, and the deviation in one or more other sub-modules connected between the first and second sub-modules are greater than or equal to a reference deviation, the failure section determination unit determines that a short-circuit failure occurs between the first sub-module and the second sub-module.

3. The power conversion device according to claim 2, wherein when the deviation in one sub-module among the plurality of sub-modules is greater than or equal to the reference deviation and the deviations in remaining sub-modules other than the one sub-module is less than the reference deviation, the failure section determination unit determines that a failure occurs in the one sub-module itself.

4. The power conversion device according to claim 3, wherein
   each of the sub-modules includes a bypass switch to short-circuit each of the sub-modules, and
   when a failure occurs in the one sub-module itself, the command output unit outputs a turn-on command turning on the bypass switch included in the one sub-module as the operation command.

5. The power conversion device according to claim 2, wherein when the short-circuit failure occurs, the command output unit outputs a stop command stopping operation of the plurality of sub-modules as the operation command.

6. The power conversion device according to claim 5, wherein the control device further includes a signal output unit to output a trip signal opening a circuit breaker connected to the AC circuit when the short-circuit failure continues.

7. The power conversion device according to claim 5, wherein when the short-circuit failure does not continue, the command output unit outputs a recovery command recovering the operation of the plurality of sub-modules.

8. The power conversion device according to claim 1, wherein
   the control device includes a host device and a relay device to relay communication between the host device and the plurality of sub-modules,
   the host device includes the acquisition unit, the deviation calculator, the failure section determination unit, and the command output unit,
   the host device transmits the operation command to the relay device through a first communication path, and
   the relay device transmits the voltage value of the capacitor received from each of the sub-modules to the host device through a second communication path different from the first communication path.

9. The power conversion device according to claim 1, wherein
   the reference variance value is the variance value when the capacitor included in each of the sub-modules is not deteriorated, and
   the control device further includes a deterioration determination unit to determine whether the capacitor included in each of the sub-modules is deteriorated based on the deviation in each of the sub-modules when the internal failure is not detected.

10. The power conversion device according to claim 3, wherein when the short-circuit failure occurs, the command output unit outputs a stop command stopping operation of the plurality of sub-modules as the operation command.

11. The power conversion device according to claim 4, wherein when the short-circuit failure occurs, the command output unit outputs a stop command stopping operation of the plurality of sub-modules as the operation command.

12. The power conversion device according to claim 6, wherein when the short-circuit failure does not continue, the command output unit outputs a recovery command recovering the operation of the plurality of sub-modules.

13. The power conversion device according to claim 2, wherein
   the control device includes a host device and a relay device to relay communication between the host device and the plurality of sub-modules,
   the host device includes the acquisition unit, the deviation calculator, the failure section determination unit, and the command output unit,
   the host device transmits the operation command to the relay device through a first communication path, and
   the relay device transmits the voltage value of the capacitor received from each of the sub-modules to the host device through a second communication path different from the first communication path.

14. The power conversion device according to claim 3, wherein
   the control device includes a host device and a relay device to relay communication between the host device and the plurality of sub-modules,
   the host device includes the acquisition unit, the deviation calculator, the failure section determination unit, and the command output unit,
   the host device transmits the operation command to the relay device through a first communication path, and
   the relay device transmits the voltage value of the capacitor received from each of the sub-modules to the host device through a second communication path different from the first communication path.

15. The power conversion device according to claim 4, wherein
   the control device includes a host device and a relay device to relay communication between the host device and the plurality of sub-modules,
   the host device includes the acquisition unit, the deviation calculator, the failure section determination unit, and the command output unit, the host device transmits the operation command to the relay device through a first communication path, and the relay device transmits the voltage value of the capacitor received from each of the sub-modules to the host device through a second communication path different from the first communication path.

16. The power conversion device according to claim 5, wherein the control device includes a host device and a relay device to relay communication between the host device and the plurality of sub-modules, the host device includes the acquisition unit, the deviation calculator, the failure section determination unit, and the command output unit, the host device transmits the operation command to the relay device through a first communication path, and the relay device transmits the voltage value of the capacitor received from each of the sub-modules to the host device through a second communication path different from the first communication path.

17. The power conversion device according to claim 6, wherein the control device includes a host device and a relay device to relay communication between the host device and the plurality of sub-modules, the host device includes the acquisition unit, the deviation calculator, the failure section determination unit, and the command output unit, the host device transmits the operation command to the relay device through a first communication path, and the relay device transmits the voltage value of the capacitor received from each of the sub-modules to the host device through a second communication path different from the first communication path.

18. The power conversion device according to claim 7, wherein the control device includes a host device and a relay device to relay communication between the host device and the plurality of sub-modules, the host device includes the acquisition unit, the deviation calculator, the failure section determination unit, and the command output unit, the host device transmits the operation command to the relay device through a first communication path, and the relay device transmits the voltage value of the capacitor received from each of the sub-modules to the host device through a second communication path different from the first communication path.

19. The power conversion device according to claim 2, wherein the reference variance value is the variance value when the capacitor included in each of the sub-modules is not deteriorated, and the control device further includes a deterioration determination unit to determine whether the capacitor included in each of the sub-modules is deteriorated based on the deviation in each of the sub-modules when the internal failure is not detected.

20. The power conversion device according to claim 3, wherein the reference variance value is the variance value when the capacitor included in each of the sub-modules is not deteriorated, and the control device further includes a deterioration determination unit to determine whether the capacitor included in each of the sub-modules is deteriorated based on the deviation in each of the sub-modules when the internal failure is not detected.

* * * * *